(12) United States Patent
Wang et al.

(10) Patent No.: US 7,675,651 B2
(45) Date of Patent: Mar. 9, 2010

(54) MOIRE-FREE COLOR HALFTONE CONFIGURATION EMPLOYING COMMON FREQUENCY VECTORS

(75) Inventors: Shen-Ge Wang, Fairport, NY (US); Robert P Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 713 days.

(21) Appl. No.: 11/565,434

(22) Filed: Nov. 30, 2006

(65) Prior Publication Data
US 2008/0130055 A1 Jun. 5, 2008

(51) Int. Cl.
*G06K 15/00* (2006.01)

(52) U.S. Cl. .................... 358/3.06; 358/1.9; 358/533; 358/536

(58) Field of Classification Search .................. 358/1.1, 358/1.9, 3.04, 3.06, 3.09, 3.1, 533, 534, 536
See application file for complete search history.

(56) References Cited

U.S. PATENT DOCUMENTS

| | | | |
|---|---|---|---|
| 5,155,599 A * | 10/1992 | Delabastita | 358/3.07 |
| 5,323,245 A | 6/1994 | Rylander | |
| 5,371,612 A * | 12/1994 | Sakamoto | 358/3.2 |
| 5,583,660 A * | 12/1996 | Rylander | 358/3.17 |
| 5,870,530 A | 2/1999 | Balasubramanian | |
| 5,892,891 A | 4/1999 | Dalal et al. | |
| 6,798,539 B1 * | 9/2004 | Wang et al. | 358/1.9 |
| 6,972,871 B2 * | 12/2005 | Tsuda et al. | 358/1.9 |
| 6,985,256 B2 * | 1/2006 | Cheng et al. | 358/1.9 |
| 7,480,076 B2 * | 1/2009 | Wang | 358/1.9 |
| 2003/0035145 A1 * | 2/2003 | Wang | 358/3.06 |
| 2004/0109184 A1 | 6/2004 | Ishii | |
| 2004/0239967 A1 * | 12/2004 | Wen | 358/1.9 |
| 2006/0066910 A1 * | 3/2006 | Yasutomi | 358/3.13 |
| 2006/0170975 A1 | 8/2006 | Wang | |

OTHER PUBLICATIONS

Wang et al., U.S. Appl. No. 11/565,455, entitled "Rosette Printing With Up to Five Colors".
Wang et al., U.S. Appl. No. 11/565,470, entitled "N-Color Printing With Hexagonal Rosettes".
T. M. Holladay, "*An Optimum Algorithm for Halftone Generation for Displays and Hard Copies*", Proc. Soc. for Information Display, 21, p. 185 (1980).
J. A. G. Yule, "*Principles of Color Reproduction*", John Wiley & Sons. N.Y. 1967.

* cited by examiner

*Primary Examiner*—Thomas D Lee
(74) *Attorney, Agent, or Firm*—Philip E. Blair; Fleit, Gibbons, Gutman, Bongini & Bianco P.L.

(57) ABSTRACT

Disclosed herein is a method and apparatus for moiré-free color halftone printing with up to four color image separations. The method and apparatus utilize a plurality of non-orthogonal halftone screens to produce outputs that are moiré free and form uniform periodic rosettes. The method and apparatus provide for defining a first and a second color halftone screen fundamental frequency vector for each of three halftone screens such that the halftone screen set output forms uniform hexagonal rosettes; then defining a fourth color halftone screen where a first fundamental vector of the fourth screen shares a fundamental frequency vector with one of said three halftone screens and a second fundamental frequency vector of the fourth screen shares a fundamental frequency vector with a different one of said three color halftone screens.

19 Claims, 12 Drawing Sheets
(10 of 12 Drawing Sheet(s) Filed in Color)

FIG. 12

MOIRE-FREE COLOR HALFTONE CONFIGURATION EMPLOYING COMMON FREQUENCY VECTORS

CROSS-REFERENCE TO COPENDING APPLICATIONS

Attention is directed to the following commonly assigned and co-pending applications filed concurrently herewith: U.S. Publication No. 2008/0130056, entitled" "Rosette Printing With Up To Five Colors"; and U.S. Publication No. 2008/0130054, entitled: "N-Color Printing With Hexagonal Rosettes"; the disclosure found in these co-pending applications are hereby incorporated by reference in their entirety. The appropriate components and processes of the above co-pending applications may be selected for the teaching and support of the present application in embodiments thereof.

CROSS REFERENCE TO RELATED APPLICATIONS

Cross reference is made to the following patents and publications, the disclosures of each of which are totally incorporated by reference herein: U.S. Pat. No. 7,480,076 entitled: "Moiré-Free Color Halftone Configuration" to Wang; and U.S. Publication No. 2004/0109184, entitled: "Image Forming Apparatus And Method Thereof" to Ishii. The appropriate components and processes of the above cross referenced patents and applications may be selected for the teaching and support of the present application in embodiments thereof.

TECHNOLOGY

The teachings herein are directed to a method and apparatus for moiré-free halftoning color printing using combinations of non-orthogonal clustered-dots screens.

BACKGROUND

With the advent of inexpensive digital color printers, methods and systems of color digital halftoning have become increasingly important in the reproduction of printed or displayed images possessing continuous color tones. It is well understood that most digital color printers operate in a binary mode, i.e., for each color separation, a corresponding color spot is either printed or not printed at a specified location or pixel. Digital halftoning controls the printing of color spots, where the spatial averaging of the printed color spots by either a human visual system or a viewing instrument, provides the illusion of the required continuous color tones.

The most common halftone technique is screening, which compares the required continuous color tone level of each pixel for each color separation with one or more predetermined threshold levels. The predetermined threshold levels are typically defined for a rectangular cell that is tiled to fill the plane of an image, thereby forming a halftone screen of threshold values. At a given pixel if the required color tone level is darker than the threshold halftone level, a color spot is printed at that specified pixel. Otherwise the color spot is not printed. The output of the screening process is a binary pattern of multiple small "dots", which are regularly spaced as is determined by the size, shape, and tiling of the halftone cell. In other words, the screening output, as a two-dimensionally repeated pattern, possesses two fundamental spatial frequencies, which are completely defined by the geometry of the halftone screen.

It is understood in the art that the distribution of printed pixels depends on the design of the halftone screen. For clustered-dot halftone screens, all printed pixels formed using a single halftone cell typically group into one or more clusters. If a halftone cell only generates a single cluster, it is referred to as a single-dot halftone or single-dot halftone screen. Alternatively, halftone screens may be dual-dot, tri-dot, quad-dot, or the like.

While halftoning is often described in terms of halftone dots, it should be appreciated that idealized halftone dots can possess a variety of shapes that include rectangles, squares, lines, circles, ellipses, "plus signs", X-shapes, pinwheels, and pincushions, and actual printed dots can possess distortions and fragmentation of those idealized shapes introduced by digitization and the physical printing process. Various digital halftone screens having different shapes and angles are described in: "*An Optimum Algorithm for Halftone Generation for Displays and Hard Copies*", by T. M. Holladay, Proceedings of the Society for Information Display (Proc. SID), Vol. 21, No. 2, pp. 185 (1980).

A common problem that arises in digital color halftoning is the manifestation of moiré patterns. Moiré patterns are undesirable interference patterns that occur when two or more color halftone separations are printed over each other. Since color mixing during the printing process is a non-linear process, frequency components other than the fundamental frequencies and harmonics of the individual color halftone separations can occur in the final printout. For example, if an identical halftone screen is used for two color separations, theoretically, there should be no moiré patterns. However, any slight misalignment between the two color halftone separations occurring from an angular difference and/or a scalar difference will result in two slightly different fundamental frequency vectors. Due to nonlinear color mixing the difference in frequency vectors produces a beat frequency which will be visibly evident as a very pronounced moiré interference pattern in the output. Additionally, lateral displacement misregistration can result in significant color shifts if an identical halftone screen is used for two color separations. To avoid, for example, two-color moiré patterns and other color shifts due to misalignment and misregistration, or for other reasons, different halftone screens are commonly used for different color separations, where the fundamental frequency vectors of the different halftone screens are separated by relatively large angles. Therefore, the frequency difference between any two fundamental frequencies of the different screens will be large enough so that no visibly objectionable moiré patterns are produced.

In selecting different halftone screens, for example for three color separations, it is desirable to avoid any two-color moiré as well as any three-color moiré. It is well known that in the traditional printing industry that three halftone screens, which can be constructed by halftone cells that are square in shape and identical, can be placed at 15°, 45°, and 75°, respectively, from a point and axis of origin, to provide the classical three-color moiré-free solution. This is described in "*Principles of Color Reproduction*", by J. A. G. Yule, John Wiley & Sons. N.Y. (1967).

However, for digital halftoning, the freedom to rotate a halftone screen is limited by the raster structure, which defines the position of each pixel. Since) tan(15°) and tan (75°) are irrational numbers, rotating a halftone screen to 15° or 75° cannot be implemented exactly in digital halftoning. To this end, some methods have been proposed to provide approximate instead of exact moiré-free solutions. For example, in U.S. Pat. No. 5,323,245, entitled: "Perpendicular, Unequal Frequency Non-Conventional Screen Patterns For Electronic Halftone Generation", and in U.S. Pat. No. 5,583,660, entitled: "Non-Perpendicular, Equal Frequency Non-Conventional Screen Patterns For Electronic Halftone Generation", this problem is approached by using a combination of two or more perpendicular, unequal frequency screen patterns and non-perpendicular, equal frequency non-conventional screen patterns. However, all these approximate solutions result in some halftone dots having centers that do not lie directly on addressable points, or on the pixel positions defined by the raster structure. Therefore, the shape and center location varies from one halftone dot to another. Consequently, additional interference or moiré between the screen frequencies and the raster frequency can occur. In another approach, U.S. Pat. No. 5,371,612, entitled: "Method Of And Apparatus For Forming Halftone Images" discloses a moiré prevention method to determine screen angles and sizes that is usable solely for square-shaped, halftone screens.

U.S. Pat. No. 6,798,539, entitled: "Method For Moiré-Free Color Halftoning Using Non-Orthogonal Cluster Screens" to Wang et al., discloses methods for using single-cell, non-orthogonal clustered-dot screens to satisfy the moiré-free conditions for color halftoning. The disclosure also provides methods that combine single-cell non-orthogonal clustered-dot screens and line screens for moiré-free color halftoning. Particularly, the selection of these single-cell halftone screens is determined by satisfying moiré-free conditions provided in the respective spatial or frequency equations. U.S. Pat. No. 6,798,539 to Wang et al. provides a background basis for the disclosure as taught in the specification which follows below, and as such it, as well as all of the above cited patents are hereby incorporated in their entirety for their teachings.

The difficulty in avoiding moiré between halftone screens is further exacerbated by the common practice of printing four colors. Four-color printing typically employs halftoning methods for the yellow image separation that produce less than optimal image quality. Typical clustered-dot methods often possess some residual moiré. The typical clustered-dot yellow configuration assumes square halftone cells and places yellow at 0° with a frequency that is ≈10% higher than the other screens. Low contrast moiré can be seen in many printed images for certain combinations of yellow and other colorants. Another common configuration for yellow utilizes a stochastic screen or error diffusion for yellow. That configuration results in a high degree of instability when used on many different printers. The result is inconsistency of color page-to-page and non-uniformity of color within a page.

BRIEF SUMMARY

As provided herein, there are supplied teachings to systems and methods that combine non-orthogonal clustered-dot screens in different color separations for moiré-free color halftoning.

Disclosed in embodiments herein is an image forming method for digitally reproducing a moiré-free color halftone image using a halftone screen set consisting of a halftone screen for each color, the method comprising defining a first color halftone screen having a first fundamental frequency vector $V_{c1}$ and second fundamental frequency vector $V_{c2}$; defining a second color halftone screen having a first fundamental frequency vector $V_{m1}$ and second fundamental frequency vector $V_{m2}$; defining a third color halftone screen having a first fundamental frequency vector $V_{y1}$ and second fundamental frequency vector $V_{y2}$; and, selecting the values of the fundamental frequency vectors $V_{c1}$, $V_{c2}$, $V_{m1}$, and $V_{m2}$ such that the combinations satisfy $V_{c1}-V_{m1}=-\frac{1}{2}V_{m2}$ and $V_{m2}-V_{c2}=-\frac{1}{2}V_{c1}$; and selecting the value $V_{y1}$ such that $V_{y1}$ equals one of $V_{c1}$, $V_{c2}$, $V_{m1}$, and $V_{m2}$.

Also disclosed in embodiments herein is an image forming method for digitally reproducing a moiré-free color halftone image using a halftone screen set consisting of a halftone screen for each color, the method comprising defining a first color halftone screen having a first fundamental frequency vector $V_{c1}$ and second fundamental frequency vector $V_{c2}$; defining a second color halftone screen having a first fundamental frequency vector $V_{m1}$ and second fundamental frequency vector $V_{m2}$; defining a third color halftone screen having a first fundamental frequency vector $V_{y1}$ and second fundamental frequency vector $V_{y2}$; defining a fourth color halftone screen having a first fundamental frequency vector $V_{k1}$ and second fundamental frequency vector $V_{k2}$; and, selecting the values of the fundamental frequency vectors $V_{c1}$, $V_{c2}$, $V_{m1}$, $V_{m2}$, $V_{k1}$, and $V_{k2}$ such that the combinations satisfy $V_{c1}-V_{m1}=-\frac{1}{2}V_{m2}$, $V_{m2}-V_{c2}=-\frac{1}{2}V_{c1}$, $V_{k2}-V_{c2}=\frac{1}{2}V_{c1}$, and $V_{k1}-V_{m1}=\frac{1}{2}V_{m2}$; and selecting the value for $V_{y1}$ such that $V_{y1}$ equals one of $V_{c1}$, $V_{c2}$, $V_{m1}$, and $V_{m2}$; and selecting the value for $V_{y2}$ such that $V_{y2}$ equals one of $V_{c1}$, $V_{c2}$, $V_{m1}$, $V_{m2}$, $V_{k1}$, and $V_{k2}$, and not is equal to $\pm V_{k1}$.

Further disclosed in embodiments herein is an image forming method for digitally reproducing a moiré-free color halftone image using a halftone screen set consisting of a halftone screen for each color, the method comprising defining a first color halftone screen having a first fundamental frequency vector $V_{c1}$ and second fundamental frequency vector $V_{c2}$; defining a second color halftone screen having a first fundamental frequency vector $V_{m1}$ and second fundamental frequency vector $V_{m2}$; defining a third color halftone screen having a first fundamental frequency vector $V_{y1}$ and second fundamental frequency vector $V_{y2}$; defining a fourth color halftone screen having a first fundamental frequency vector $V_{k1}$, and second fundamental frequency vector $V_{k2}$; and, selecting the values of the fundamental frequency vectors $V_{c1}$, $V_{c2}$, $V_{m1}$, $V_{m2}$, $V_{k1}$, and $V_{k2}$; such that the combinations satisfy $V_{c1}-V_{m1}=-\frac{1}{2}V_{m2}$, $V_{m2}-V_{c2}=-\frac{1}{2}V_{c1}$, $V_{k2}-V_{c2}=\frac{1}{2}V_{c1}$, and $V_{c1}-V_{k1}=\frac{1}{2}V_{k2}$; and combinations further satisfy at least one of $V_{c1}-V_{m1}+V_{k2}=0$ and $V_{c2}-V_{m2}+V_{k1}=0$; and selecting the value for $V_{y1}$, such that $V_{y1}$, equals one of $V_{c1}$, $V_{c2}$, $V_{m1}$, and $V_{m2}$; and selecting the value for $V_{y2}$ such that $V_{y2}$ equals one of $V_{c1}$, $V_{c2}$, $V_{m1}$, $V_{m2}$, $V_{k1}$, and $V_{k2}$; and not is equal to $\pm V_{y1}$.

Further disclosed in embodiments herein is a method for generating a plurality of non-orthogonal halftone screen outputs for moiré free color halftoning, the method comprising defining a first and a second color halftone screen fundamental frequency vector for each of three halftone screens such that the halftone screen set output forms uniform hexagonal rosettes; defining a fourth color halftone screen where a first fundamental vector of the fourth screen shares a fundamental frequency vector with one of said three halftone screens and a second fundamental frequency vector of the fourth screen shares a fundamental frequency vector with a different one of said three color halftone screens.

Further disclosed in embodiments herein is a color halftoning screening apparatus for reproducing a moiré-free color halftone image using a halftone screen set consisting of a halftone screen for each color, the apparatus comprising defining a first color halftone screen having a first fundamental frequency vector $V_{c1}$ and second fundamental frequency vector $V_{c2}$; defining a second color halftone screen having a first fundamental frequency vector $V_{m1}$ and second fundamental frequency vector $V_{m2}$; defining a third color halftone screen having a first fundamental frequency vector $V_{y1}$ and second fundamental frequency vector $V_{y2}$; and, selecting the values of the fundamental frequency vectors $V_{c1}$, $V_{c2}$, $V_{m1}$, and $V_{m2}$ such that the combinations satisfy $V_{c1}-V_{m1}=-\frac{1}{2}V_{m2}$, and $V_{m2}-V_{c2}=-\frac{1}{2}V_{c1}$; and selecting the value $V_{y1}$ such that $V_{y1}$ equals one of equals one of $V_{c1}$, $V_{c2}$, $V_{m1}$, and $V_{m2}$.

Further disclosed in embodiments herein is a color halftoning screening apparatus for reproducing a moiré-free color halftone image using a halftone screen set consisting of a halftone screen for each color, the apparatus comprising defining a first color halftone screen having a first fundamental frequency vector $V_{c1}$ and second fundamental frequency vector $V_{c2}$; defining a second color halftone screen having a first fundamental frequency vector $V_{m1}$ and second fundamental frequency vector $V_{m2}$; defining a third color halftone screen having a first fundamental frequency vector $V_{y1}$ and second fundamental frequency vector $V_{y2}$; defining a fourth color halftone screen having a first fundamental frequency vector $V_{k1}$ and second fundamental frequency vector $V_{k2}$; and, selecting the values of the fundamental frequency vectors $V_{c1}$, $V_{c2}$, $V_{m1}$, $V_{m2}$, $V_{k1}$, and $V_{k2}$; such that the combinations satisfy $V_{c1}-V_{m1}=-\frac{1}{2}V_{m2}$, $V_{m2}-V_{c2}=-\frac{1}{2}V_{c1}$, $V_{k2}-V_{c2}=\frac{1}{2}V_{c1}$, and $V_{c1}-V_{k1}=\frac{1}{2}V_{k2}$; and selecting the value for $V_{y1}$ such that $V_{y1}$ equals one of $V_{c1}$, $V_{c2}$, $V_{m1}$, and $V_{m2}$; and selecting the value for $V_{y2}$ such that $V_{y2}$ equals one of $V_{c1}$, $V_{c2}$, $V_{m1}$, $V_{m2}$, $V_{k1}$, and $V_{k2}$, and not is equal to $\pm V_{y1}$.

Further disclosed in embodiments herein is a color halftoning screening apparatus for reproducing a moiré-free color halftone image using a halftone screen set consisting of a halftone screen for each color, the apparatus comprising defining a first color halftone screen having a first fundamental frequency vector $V_{c1}$ and second fundamental frequency vector $V_{c2}$; defining a second color halftone screen having a first fundamental frequency vector $V_{m1}$ and second fundamental frequency vector $V_{m2}$; defining a third color halftone screen having a first fundamental frequency vector $V_{y1}$ and second fundamental frequency vector $V_{y2}$; defining a fourth color halftone screen having a first fundamental frequency vector $V_{k1}$ and second fundamental frequency vector $V_{k2}$; and, selecting the values of the fundamental frequency vectors $V_{c1}$, $V_{c2}$, $V_{m1}$, $V_{m2}$, $V_{k1}$, and $V_{k2}$; such that the combinations satisfy $V_{c1}-V_{m1}=-\frac{1}{2}V_{m2}$, $V_{m2}-V_{c2}=-\frac{1}{2}V_{c1}$, $V_{k2}-V_{c2}=\frac{1}{2}V_{c1}$, and $V_{c1}-V_{k1}=\frac{1}{2}V_{k2}$; and combinations further satisfy at least one of $V_{c1}-V_{m1}+V_{k2}=0$ and $V_{c2}-V_{m2}+V_{k1}=0$; and selecting the value for $V_{y1}$ such that $V_{y1}$ equals one of $V_{c1}$, $V_{c2}$, $V_{m1}$, and $V_{m2}$; and selecting the value for $V_{y2}$ such that $V_{y2}$ equals one of $V_{c1}$, $V_{c2}$, $V_{m1}$, $V_{m2}$, $V_{k1}$, and $V_{k2}$, and not is equal to $\pm V_{y1}$.

BRIEF DESCRIPTION OF THE DRAWINGS

The patent or application file contains at least one drawing executed in color. Copies of this patent or patent application publication with color drawings will be provided by the Patent Office upon request and payment of the necessary fee. The foregoing and other features and advantages of the subject matter disclosed herein will be made apparent from the following detailed description taken in conjunction with the accompanying drawings, in which.

DETAILED DESCRIPTION

The teachings disclosed herein provide a color halftone configuration that produces consistent rosettes free of moiré when printing 2, 3 or 4 color halftone separations. With the non-orthogonal halftone screen technology thus developed it is possible to design four clustered-dot halftone screens to generate halftone outputs with rosettes appearing as ordered hexagons of identical shape. The hexagon rosettes have three fundamental spatial frequencies exactly equal to half of fundamental frequencies of the three halftone screens. As a result, the halftone outputs are truly moiré-free, because there is no frequency component, fundamental or high-order harmonic, in single color or color combination, that is lower in frequency than the fundamental frequencies of the hexagon rosettes. The requirements for achieving these exemplary hexagon rosettes are specified by several frequency-vector equations, in combination with conventional requirements for multi-color moiré-free halftoning.

Figure 1:
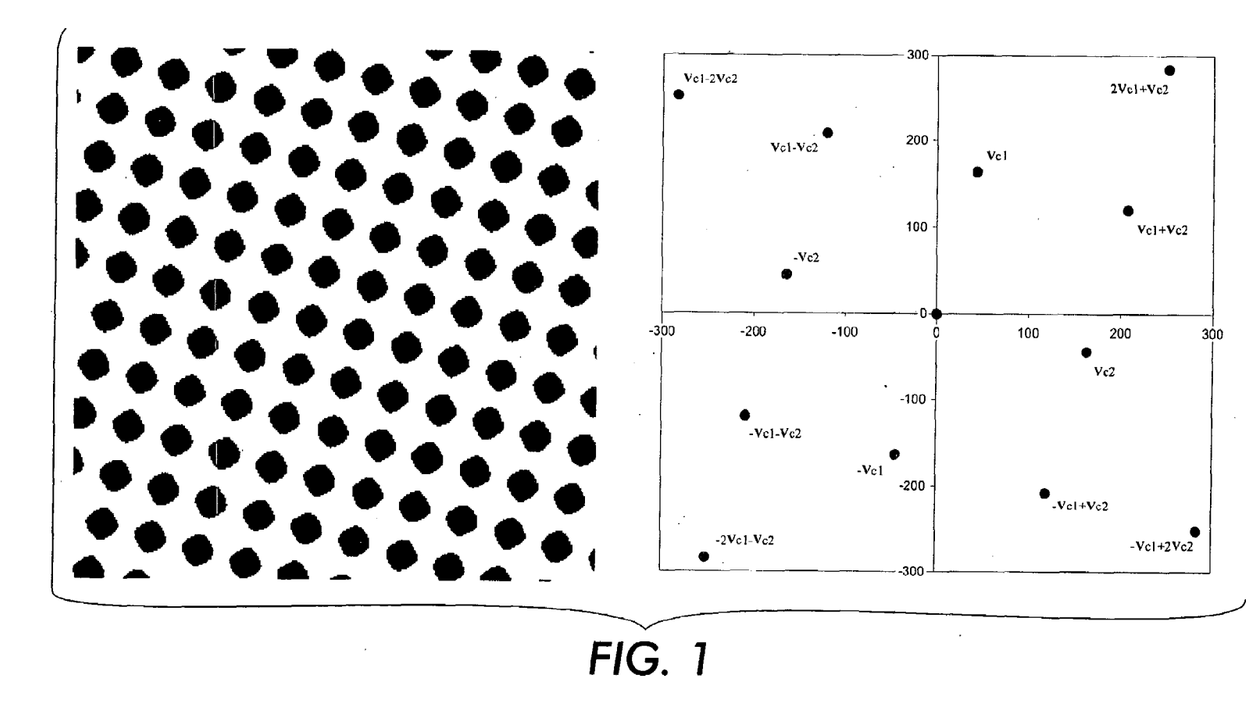
FIG. 1 depicts a halftone pattern created by a color system as its cyan screen, and along-side it the frequency representation for that cyan screen halftone pattern.
Figure 2:
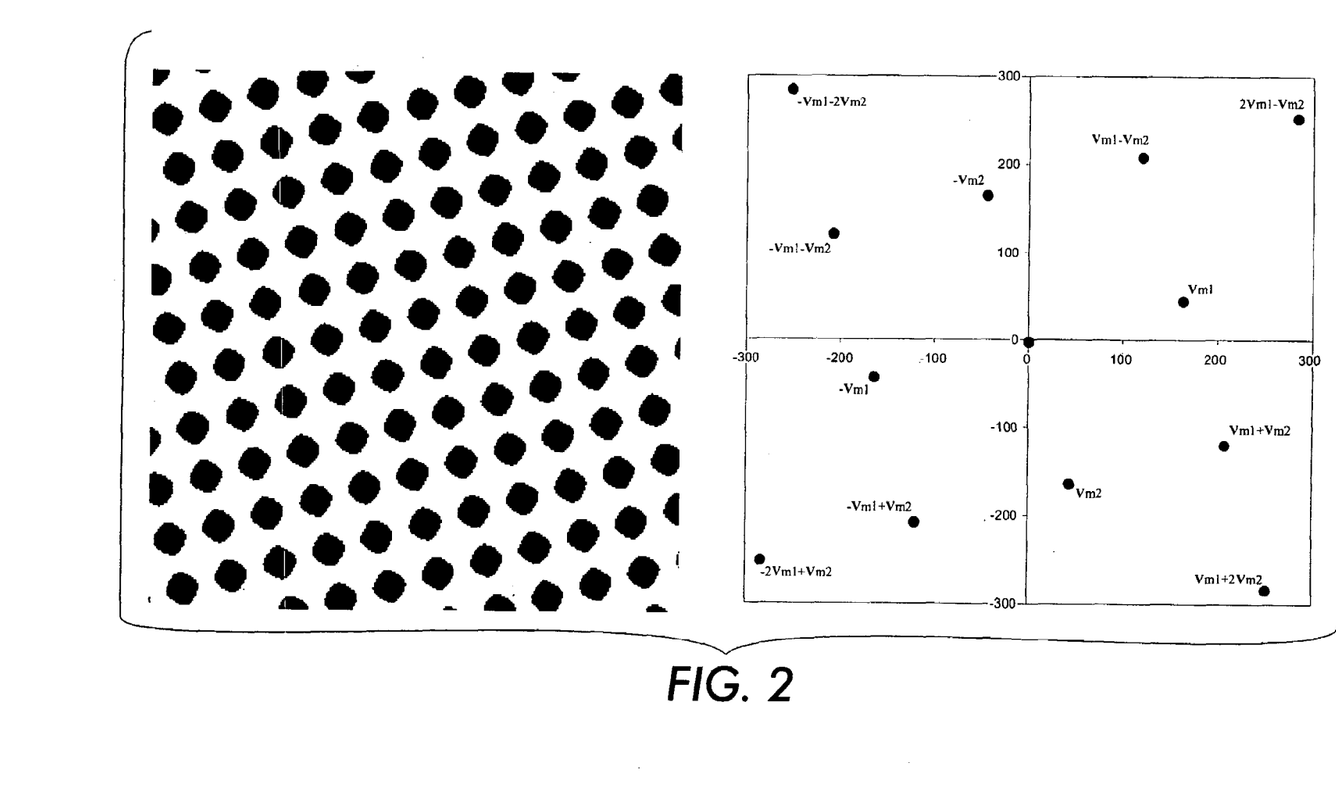
FIG. 2 depicts a halftone pattern created by a color system as its magenta screen, and along-side it the frequency representation for that magenta screen halftone pattern.
Figure 3:
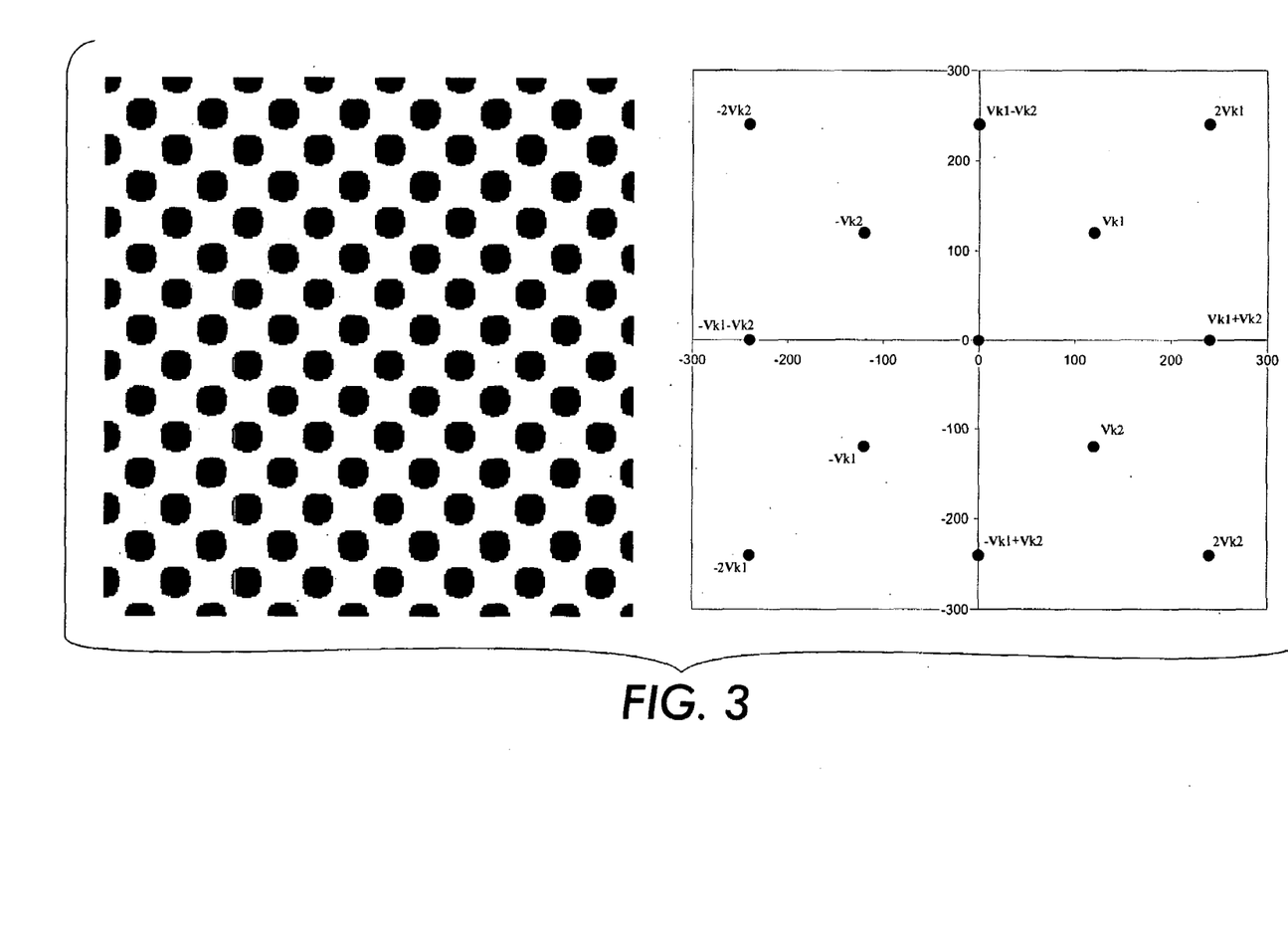
FIG. 3 depicts a halftone pattern created by a color system as its black screen, and along-side it the frequency representation for that black screen halftone pattern.

Most screening-based halftone methods use halftone screens in a two-dimensional tiling manner. Thus the corresponding halftone outputs possess strong periodic structures defined by the halftone screens. For example, in FIGS. 1-3 are three halftone patterns that demonstrate the outputs from a current exemplary color printer. The cyan pattern is the output of a 75° and −15° screen; the magenta pattern is the output of a, 15° and −75° screen; and the black is the output of a, 45° and −45°screen. All three patterns in FIGS. 1-3 show the halftone outputs as two-dimensional periodic structures (or quasi-periodical because of the multiple-dot-per cell, or super-cell approach) as the result of tiling square-shape screen cells.

Images can be also described by their Fourier transforms or their spatial frequency representations. As the result of tiling halftone screens, Fourier transforms of above halftone patterns in FIGS. 1-3 are dominated by discrete frequency components defined by the two fundamental halftone frequencies for each screen and their two-dimensional higher-order harmonics, or linear combinations of the fundamentals. For the following discussion in this specification, we use the notation illustrated by the transform plots in FIGS. 1-3 to represent the Fourier transform of halftone patterns. Only the locations of the fundamental halftone frequency vectors, $V_{c1}$, $V_{c2}$, $V_{m1}$, $V_{m2}$, $V_{k1}$, and $V_{k2}$, and some of their harmonics are shown in the spatial frequency coordinates as circular dots, and the amplitude and phase of each component are ignored in these illustrations. The sub 1 and sub 2 notation refers to vectors that are above or below the 0° axis, respectively. We use the subscripts c, m, y, and k, to aid in teaching the presently described halftoning processes due to the common practice of four-color printing with cyan, magenta, yellow, and black. While we teach using that notation, the concepts are general in that other colorants may be used. For example, we may use the notation $V_{m1}$, and use examples that refer to it as a frequency vector for the magenta screen, but it is to be understood that we intend it to generally imply a frequency vector for some available colorant. Further, we note that colorants for particular screen geometries are interchangeable. For example, we may teach with yellow halftoned with a screen of a first geometry, and black halftoned with a screen of a second geometry, but it is practical and reasonable to assume that the screens may be interchanged and yellow may be halftoned with the screen of the second geometry and black the first.

The three plots in FIGS. 1-3 are the frequency representations of the three halftone patterns in the figures, respectively. Of course, the halftones possess many higher order harmonics that are not shown in the plots due to limiting the range of the plots to ±300 lines-per-inch in both directions to simplify the plots for teaching the relevant concepts.

Figure 4:
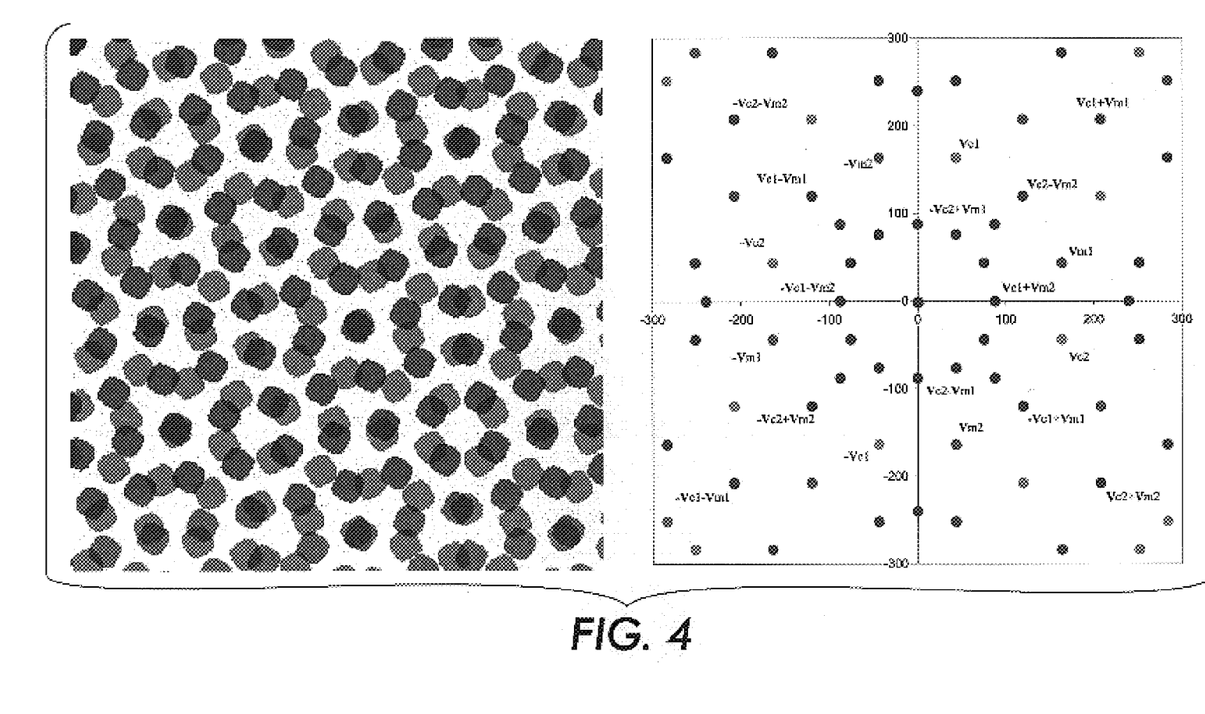
FIG. 4 depicts the superimposition of the cyan and magenta halftones as depicted in FIGS. 1 and 2 respectively, and along-side it the Fourier representation for that superimposition.

In color printing, more frequency components than the fundamental frequencies are typically created in the halftone image due to the superimposition of halftone screens for different process colors. Using Fourier analysis, we can express the result caused by such superimposition of two different colors as their frequency-vector difference, e.g., $V_{cm} = V_c \pm V_m$, where $V_x$ represents any one of $V_{x1}$, $-V_{x1}$, $V_{x2}$, $-V_{x2}$, and $V_{cm}$, is the combined vector. The sign definition of frequency vectors is rather arbitrary since each Fourier component has its conjugate, i.e., there is always a frequency vector $-V_c$ that represents the conjugate component of $V_c$. For each halftone dot screen, there are two fundamental frequency vectors, thus the color mixing of two screens for two different colors yields eight unique combined vectors for the fundamental frequencies alone. Considering the other harmonics of the halftone frequencies, the combinations can yield a large number of difference vectors. In FIG. 4, the superimposition of the cyan and magenta halftone patterns depicted in FIGS. 1 and 2 is shown on the left, and its frequency representation is on the right. Obviously, the frequency spectrum of the mixed colors is quite complicated and is certainly not a two-dimensional periodic function as is the single-color spectra shown in FIGS. 1 and 2, and this explains why the halftone pattern of the superimposition in FIG. 4 cannot be described as tiling a simple cell as it does in the simple monochromatic cases.

Figure 5:
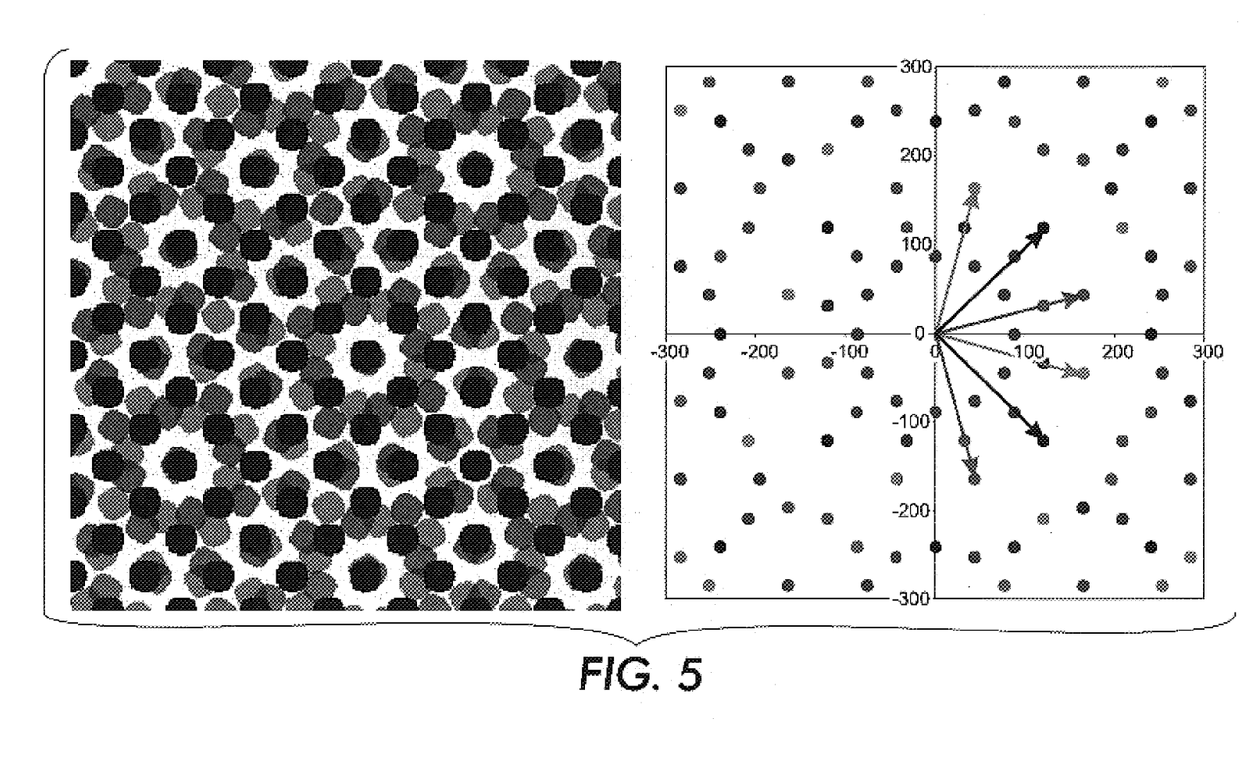
FIG. 5 depicts the superimposition of the cyan, magenta, and black halftones as depicted in FIGS. 1-3, respectively, and along-side it the Fourier representation for that superimposition.

When the superimposition involves three colors, typically, cyan, magenta and black, the situation becomes even more complex. As shown in FIG. 5, the halftone pattern, often referred to as the rosette pattern, is not a simple repeated pattern and its Fourier representation is even more complicated than that for the two-color case. In traditional press printing, a same halftone screen is rotated to exactly 15°, 75° and 45° for cyan, magenta and black, respectively. It has been proven that the rosette pattern resulting from such a halftone configuration is theoretically non-periodic. (J. A. C. Yule, "Principles of Color Reproduction" In other words, the rosette pattern never repeats on the same page.

The common strategy to avoid objectionable two-color moiré is to select frequency vectors that ensure that no two-color difference vector of the fundamental halftone frequency vectors is sufficiently small, or short in length, to be perceived as a noticeably low frequency. The two-color moiré-free condition can be summarized by $$|V_c \pm V_m| > V_{min}, \quad (1)$$

where $V_c$ represents any one of $V_{c1}$, $-V_{c1}$, $V_{c2}$, $-V_{c2}$; $V_m$ represents any one of $V_{m1}$, $-V_{m1}$, $V_{m2}$, $-V_{m2}$; and $V_{min}$ is a frequency limit set at somewhere between 50-70 lines-per-inch for just noticeable moiré.

It is well known that a troublesome moiré is the three-color moiré, which can appear in cyan-magenta-black prints produced by CMYK four-color printers. As an extension of the two-color case, one aspect of the three-color moiré-free condition can be summarized by $$|V_c \pm V_m \pm V_k| > V_{min}, \quad (2)$$

where $V_k$ represents any one of $V_{k1}$, $-V_{k1}$, $V_{k2}$, $-V_{k2}$, and $V_{min}$ is set similar to the two-color case. Since there are altogether thirty-two unique combinations of different color components for the left side of the inequality of Eq. 2, it stands as a matter of practicality that to make all three-color difference vectors as well as all two-color difference vectors large enough to avoid any color moiré is very difficult, unless the halftone screens have very high frequencies fundamentals, say higher than 200 line-per-inch. Another aspect of the moiré-free condition is to make two of the three-color difference vectors null while keeping the rest large. Given that both the signs and the indices of frequency vectors are defined somewhat arbitrarily, without losing the generality, the three-color moiré-free condition can be specified by the following two vector equations:

$$V_{c1} - V_{m1} + V_{k2} = 0 \quad (3a)$$

$$V_{c2} - V_{m2} - V_{k1} = 0 \quad (3b)$$

Figure 6A:
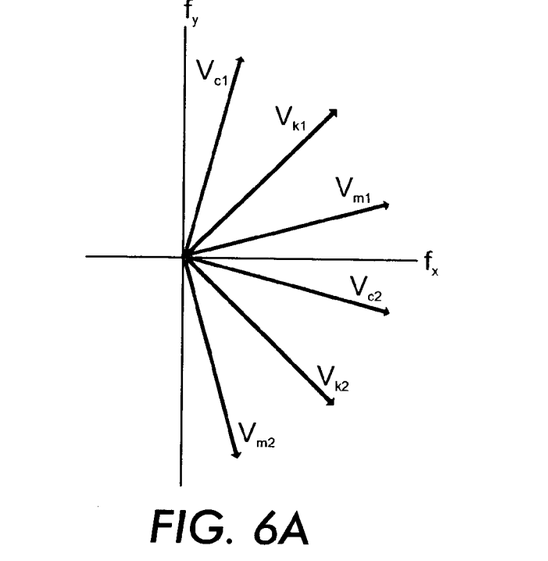
FIG. 6 depicts the frequency vectors of the cyan, magenta, and black halftones depicted in FIGS. 1-3, respectively.
Figure 6B:
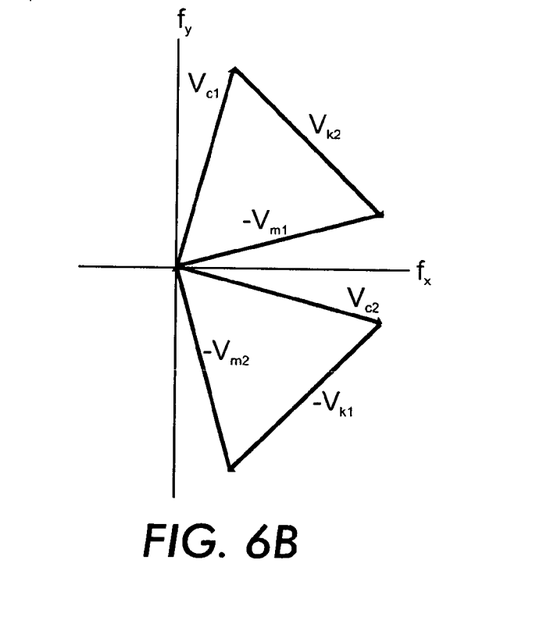

Eqs. (3a) and (3b), are two of all possible frequency combinations of the three colors. In most practical applications, the rest of the combinations satisfy the inequality of Eq. (2) and are not specially specified. The vector additions of Eq. 3 are illustrated in FIG. 6.

Most conventional halftone screens use square-shape halftone cells for tiling. Therefore, the two fundamental frequency vectors of each screen are not independent to each other. Once one of the two equations, either (3a) or (3b) is satisfied, the other one is automatically held. Recently, we have taught halftone methods (Wang et al. as incorporated by reference above) using non-orthogonal halftone cells to construct halftone screens, or general parallelogram-shape halftone cells, for moiré-free color halftoning, in which case the two fundamental frequencies of each parallelogram-shape-based screen are independent to each other and thus satisfying both Eqs. (3a) and (3b) is required for the three-color moiré-free condition.

Further concerning moiré-free non-orthogonal halftone configurations, in U.S. Pat. No. 7,480,076 to Wang, a moiré-free color halftone configuration for clustered dots is disclosed. Unlike conventional methods, the disclosed method produces periodic hexagon rosettes of identical shapes. These exemplary hexagon rosettes have three fundamental spatial frequencies exactly equal to half of the fundamental frequency of the three halftone screens. The resultant halftone outputs are truly moiré free, as all the fundamentals and harmonic frequencies are multiples of and thus higher in frequency than the rosette fundamental frequency.

It is also worth pointing out that the three-color moiré-free condition described herein is specified for the fundamental frequencies only. However, while it is understood that as a practical matter, fundamental frequencies are always more important than higher-order harmonics, there is never-theless no guarantee that the moirés caused by combining the high-order harmonics from different colors would not be observable. It is of course very desirable to have all moirés eliminated, regardless of whether they are caused by the combining of fundamental frequencies, or of high-order harmonics.

The teaching provided herein utilizes multiple non-orthogonal clustered-dot screens in an exemplary configuration to achieve halftone outputs with uniform rosettes that appear as tiled hexagons all of identical shape. Certain conditions must be satisfied for such outputs and they can be specified either in the spatial domain, where shapes of halftone cells for different colors are defined by spatial vectors, or in the frequency domain, where halftone screens are specified by frequency vectors. In the disclosure that follows, these certain conditions to be satisfied will be specified in the frequency domain by use of frequency vectors.

As discussed above, it has been shown that the frequency spectrum resulting from the superimposition of cyan and magenta as shown in FIG. 4 is much more complicated than for a single color spectra, as depicted in FIGS. 1 and 2. Achieving a simpler spectrum in the frequency domain usually also means achieving a simpler halftone pattern in the spatial domain. The frequency vector constraints that achieve a simplification can be summarized as the sum of any two frequency vectors must equal ±½ of another vector, or equal 0, or be greater or equal in length to the minimum length frequency vector. For a cyan and magenta example the relationship can be specified by the following vector equations:

$$V_{c1} - V_{m1} = -\tfrac{1}{2} V_{m2} \qquad (4a)$$

$$V_{m2} - V_{c2} = -\tfrac{1}{2} V_{c1} \qquad (4b)$$

Extending the example to include black yields following vector equations:

$$V_{k2} - V_{c2} = \tfrac{1}{2} V_{c1} \qquad (5a)$$

$$V_{c1} - V_{k1} = \tfrac{1}{2} V_{k2} \qquad (5b)$$

or $$V_{m2} + V_{k1} = \tfrac{1}{2} V_{k2} \qquad (6a)$$

$$V_{m1} - V_{k2} = -\tfrac{1}{2} V_{m2} \qquad (6b)$$

As described previously above, the sign definition of these frequency vectors is somewhat arbitrary. However, to be consistent with the previously defined moiré-free condition provided in Eqs. (3a) and (3b), this new requirement as specified in Eqs. (4)-(6) are provided with proper signs assigned for all vectors.

Figure 7:
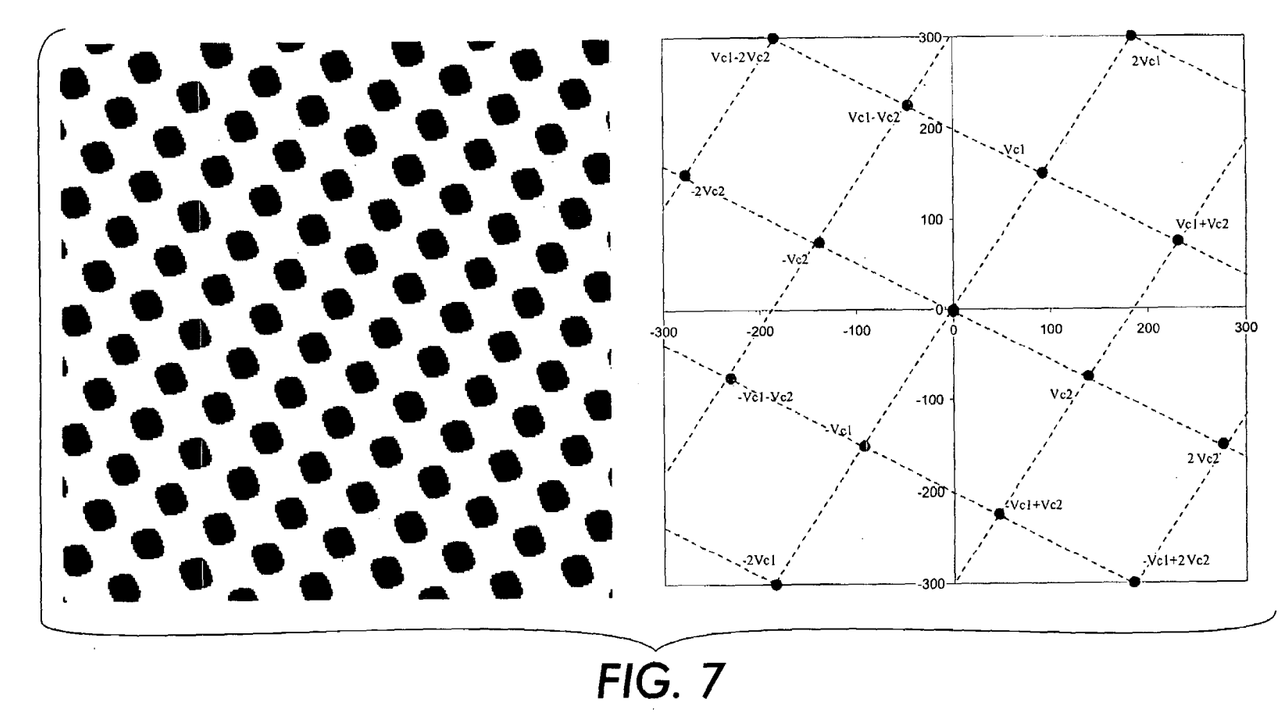
FIG. 7 depicts an exemplary cyan halftone pattern and its Fourier representation.
Figure 8:
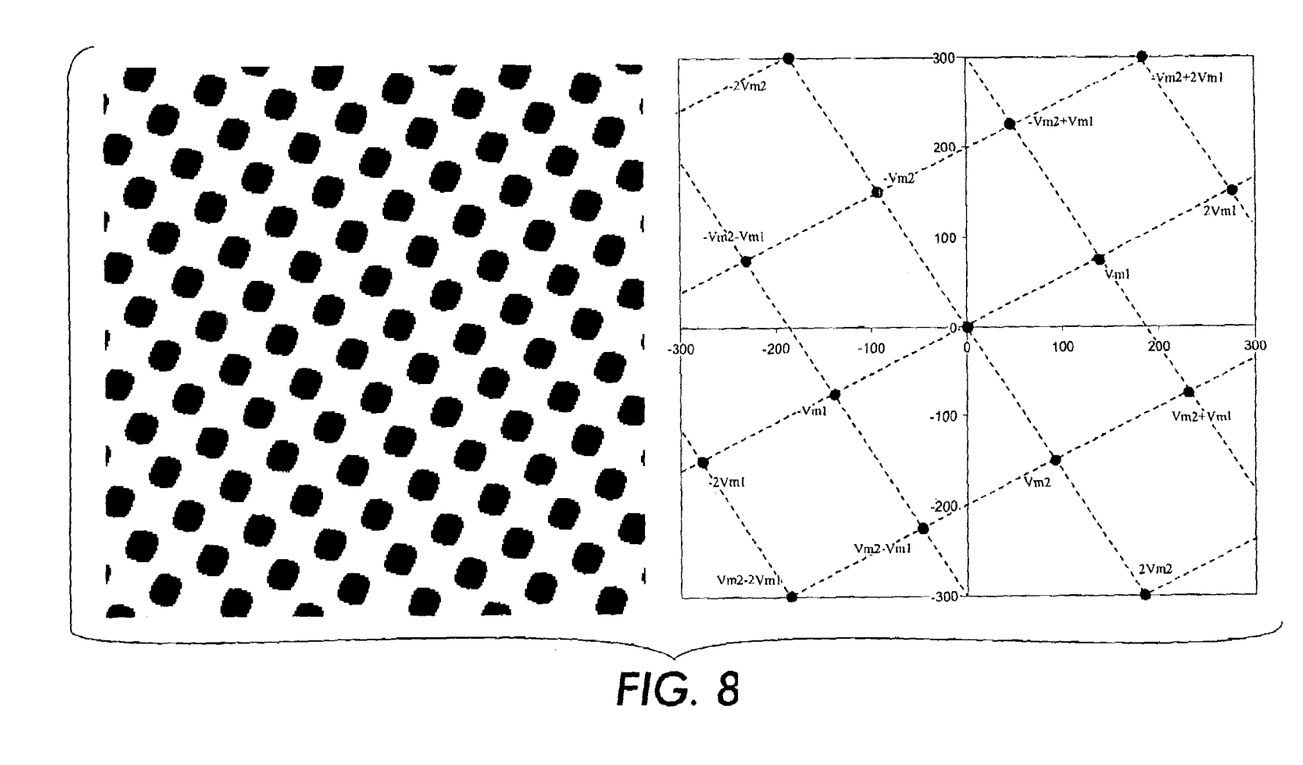
FIG. 8 depicts an exemplary magenta halftone pattern and its Fourier representation.
Figure 9:
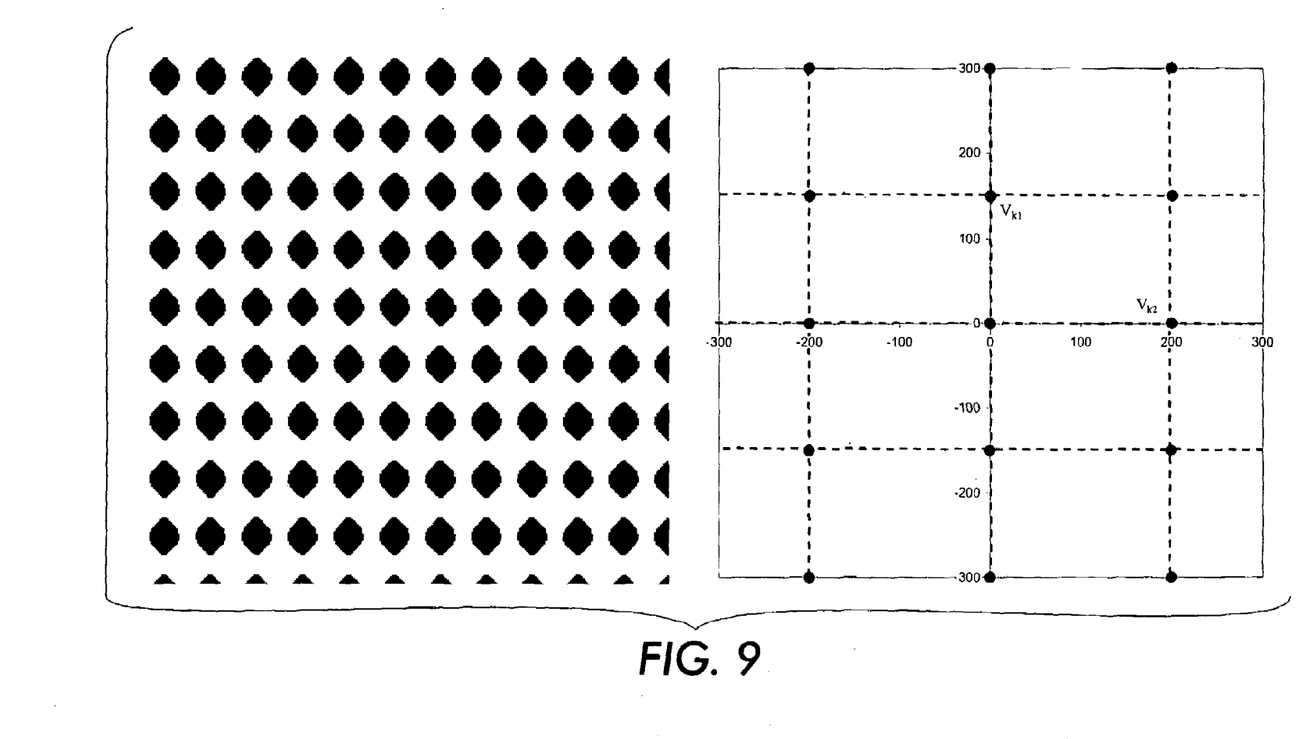
FIG. 9 depicts an exemplary black halftone pattern and its Fourier representation.

FIGS. 7, 8 and 9 show the halftone outputs as provided by three halftone screens designed to satisfy the above requirement of Eqs. (4), (5) and (6) for cyan, magenta, and black, respectively. The Fourier representations accompany the three halftone outputs illustrated in FIGS. 7, 8 and 9 as well. For the purpose of illustration in FIGS. 7, 8 and 9 and others that follow, we use a grid drawn in dashed lines to indicate the alignment of fundamental frequencies and harmonics in each Fourier plot. The directions and spacing of these dashed lines are directly specified by the two fundamental halftone frequencies of the screens.

Figure 10:
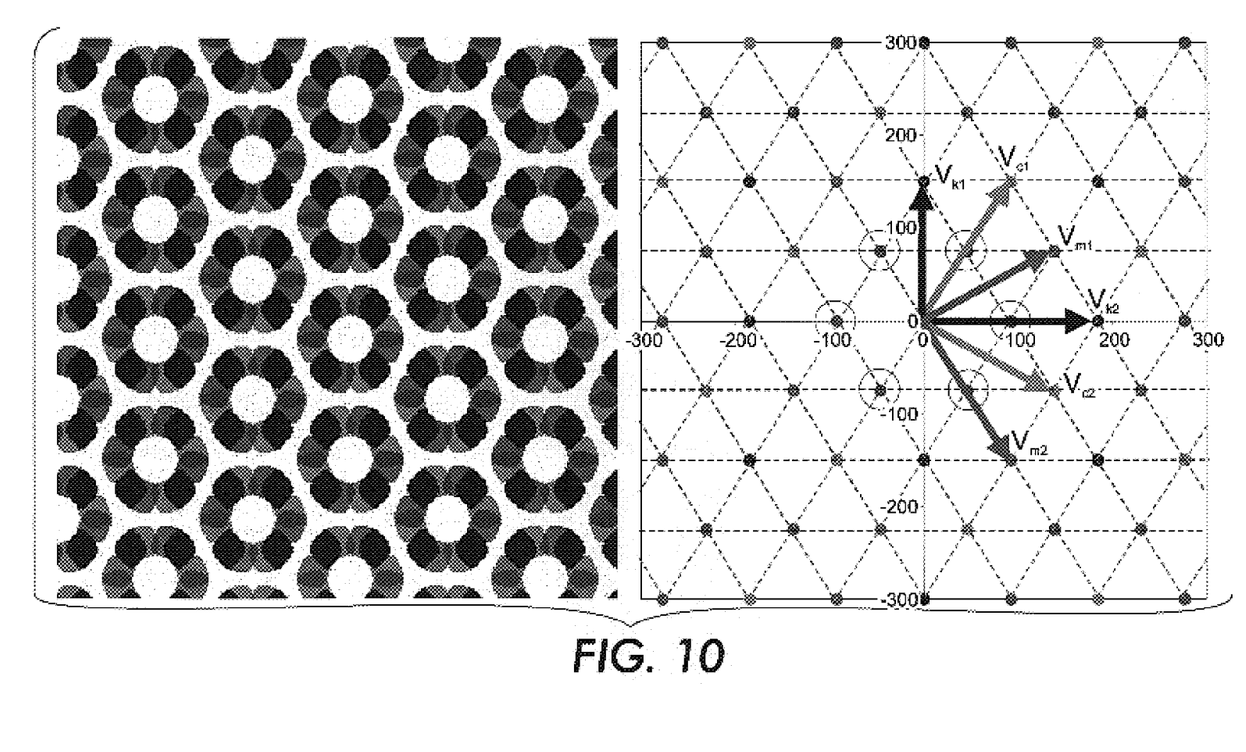
FIG. 10 depicts the superimposition of exemplary cyan, magenta, and black halftone patterns, with the corresponding Fourier representation for that exemplary rosette along-side.

FIG. 10 shows the halftone as provided by three exemplary halftone screens designed to satisfy the above requirements of Eqs. (4)-(6) for cyan, magenta, and black, respectively. The Fourier representation accompanies the halftone illustration in FIG. 10 as well. Comparing the hexagonal rosette pattern in FIG. 10 with the conventional one in FIG. 5, the rosette of FIG. 10 is much simpler and more uniform, which results in a more pleasing texture.

Besides the pleasant appearance, the most interesting observation is that all frequency components, including all fundamental frequencies and their respective harmonics of the monochromatic halftones and frequencies due to all possible color combinations, can be located a hexagonal grid in the Fourier representation of the halftone. As is expected by the vector frequency equations, Eqs. (4)-(6), all frequency components for each color are well aligned as the linear combination of two fundamental frequencies.

In conventional halftone design the fundamental frequencies and harmonics for each color, cyan, magenta, and black, do not share any common points except at the origin, or the dc term, of the Fourier transform, as depicted in the examples shown in the previous figures. However, the screen output illustrated by FIG. 10 has satisfied the linear relations specified by Eqs. (4)-(6), and therefore the colors share the same locations for their high-order components in the frequency representation. For example as shown by FIG. 10, the cyan frequency component $2V_{c1}$ (see FIG. 10) and the magenta component $2V_{m1} - V_{m2}$ (see FIG. 10) are located at exactly the same place, similarly the location for the $2V_{m1}$ component and the $V_{c1} + V_{k2}$ component are respectively the same.

It is easy to prove from Eqs. (3)-(6) that this grid and the rosette can be defined by any two of the following six frequency vectors, where the two are taken from screens of different colors:

$$\pm V_{c1}/2, \pm V_{m2}/2, \text{ and } \pm V_{k2}/2.$$

That is, due to the dependence of the frequency vectors, the grid and rosette can be specified using two frequency vectors in a manner similar to specifying a non-orthogonal halftone cell. For example, the grid and rosette in this example can be specified by $\tfrac{1}{2} V_{c1}$, $\tfrac{1}{2} V_{k2}$. As long as the frequency vectors that form this grid comply with the stated requirements, the configuration is a true moiré-free halftone, because no frequency component would be smaller than the vectors that generate the grid.

The frequency spectrum, shown in FIG. 10, of the superimposition of cyan, magenta, and black resembles the Fourier transform of a non-orthogonal halftone screen with two fundamental frequency vectors specified by frequency vectors in Eq. (7). In fact, the halftone rosette pattern shown in FIG. 10 appears exactly as the result of tiling with a parallelogram cell specified by the two frequency vectors specified in Eq. (7). Because the angle between the two vectors $V_{c1}$ and $V_{m2}$ is about 120°, this parallelogram can be also seen as a hexagon represented with a frequency vector from a third color screen of Eq. (7).

Consider extending the present hexagonal halftone configuration to employing an additional screen for an additional colorant such as yellow. The desire is to achieve the moiré-free hexagonal rosette configuration, as describe above, while introducing this additional color, that could be used with 1, 2, or 3 of the screens of the hexagonal configuration.

Because of the unique feature of the hexagonal grid of frequency harmonics for the present halftone configuration, it is possible to choose two fundamental frequency vectors for an additional color, say yellow, without introducing moiré in any of its combinations with the other colors. The additional screen can be constructed of frequency vectors of two other screens. That requirement ensures at least two interesting properties. One is that as long at the additional screen vectors are on the grid, they cannot product objectionable moiré through combination with another screen, and hexagonal rosettes are produced. A second property is that the additional screen will be angularly displaced from any one other screen. This angular displacement allows the screen to possess color-shift insensitivity to misregistration similar to other rotated screen designs.

Consider an example of choosing frequency vectors for a yellow screen that are within the scope of the present teachings. One or two yellow vectors are chosen to be one of the fundamental frequency vectors of the other three colors that have been specified to form an hexagonal rosette. That is, a frequency vector for an additional screen $V_{y1}$ equals one of that $V_{c1}$, $V_{c2}$, $V_{m1}$, $V_{m2}$ $V_{k1}$, and $V_{k2}$, which have been specified by the moiré-free hexagonal rosette conditions. In other words, the additional screen will possess at least one fundamental frequency vector in common with a fundamental frequency vector of one screen that has been specified to form a moiré-free hexagonal rosette. Assuming a dot screen is desired, the second screen vector $V_{y2}$ could be chosen from one of $V_{c1}$, $V_{c2}$, $V_{m1}$, $V_{m2}$ $V_{k1}$, and $V_{k2}$, and $V_{y2} \neq \pm V_{y1}$. One interpretation of $V_{y2} = V_{y1}$ is that the screen is a line screen having one dimensional periodicity rather that two dimensional periodicity. Another way of representing a screen that is one-dimensionally periodic is to have one of the fundamental frequency vectors specified as zero, or null. Having one screen with one dimensional periodicity is acceptable for some printing applications. As a more specific example for a dot screen halftone, one possible configuration might use one fundamental frequency vector from cyan and one from magenta for composing the yellow screen, i.e., $$V_{y1} = V_{c1}, \quad (8a)$$

$$V_{y2} = V_{m1}. \quad (8b)$$

Figure 11:
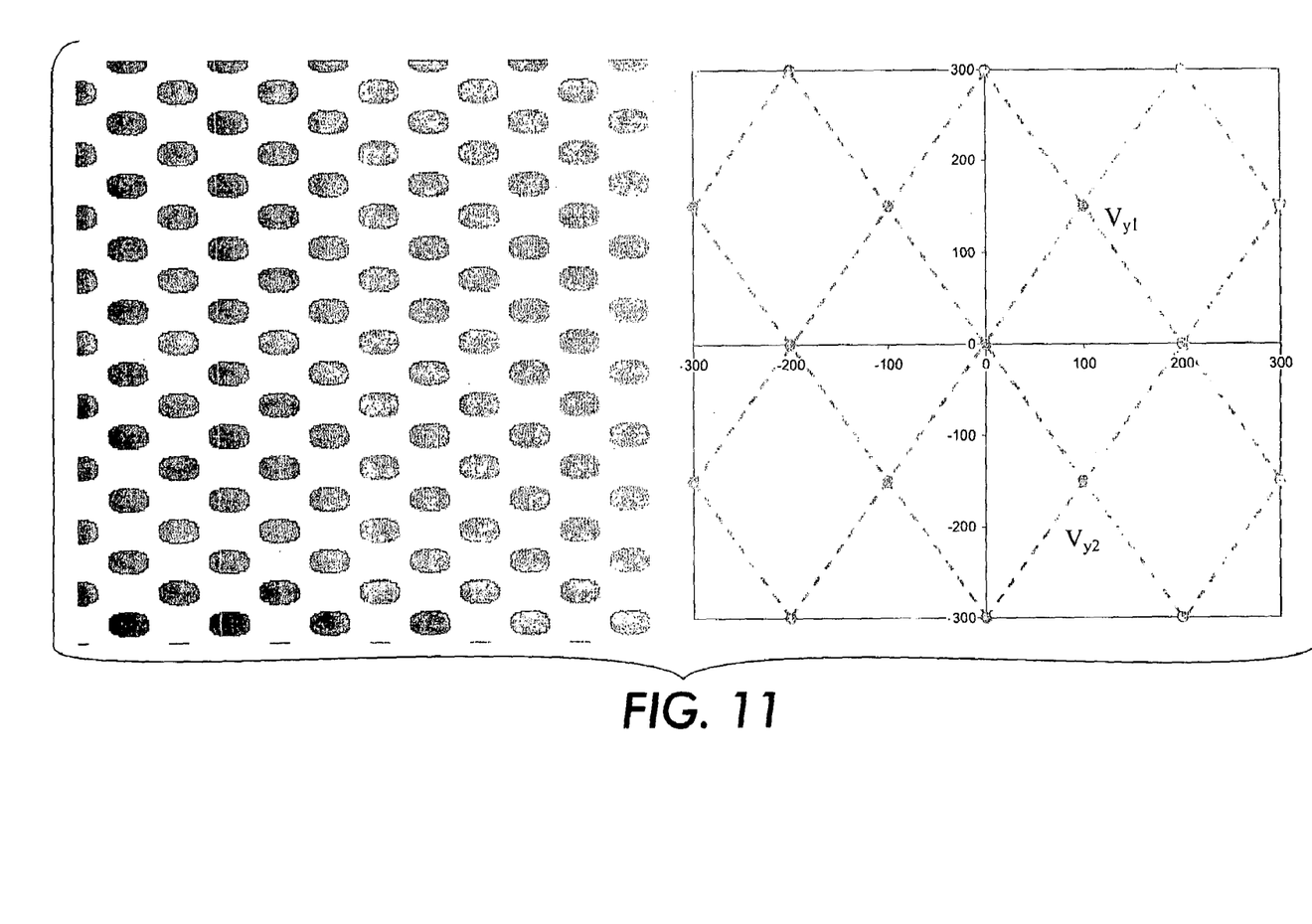
FIG. 11 depicts an exemplary yellow halftone pattern and its Fourier representation.

FIG. 11 shows the halftone output as provided by a halftone screen designed to satisfy the above requirement of Eqs. (8a) and (8b) for yellow. The Fourier representation accompanies the halftone output illustrated in FIG. 11 as well.

One particular set of cyan, magenta, black, and yellow halftone screens has been designed that satisfies the moiré-free conditions for hexagonal rosettes using up to 4 screens. The halftone rosette pattern is shown on the left side of FIG. 12 and the Fourier representation is shown on the right side. Frequency vectors are shown for the fundamental frequencies, where the frequency vector "sharing" or "common vector" requirement of Eq. (8) is illustrated. The frequency specifications of these screens are listed below. All frequency components are measured in units of line-per-inch, and frequency angles are defined with respect to the horizontal y-axis.

Figure 12:
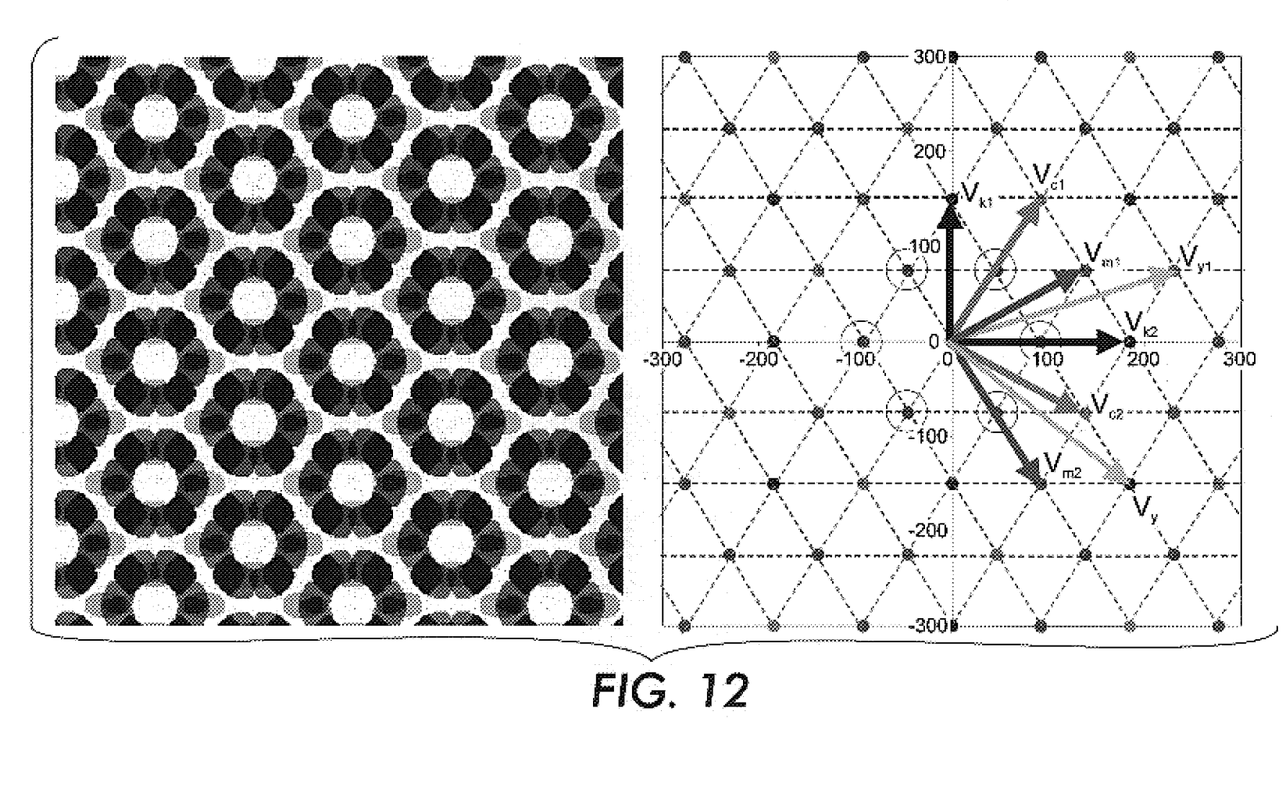
FIG. 12 depicts the superimposition of exemplary cyan, magenta, black halftone, and yellow patterns with the corresponding Fourier representation for that exemplary rosette along-side.

Cyan screen: $V_{c1}$=(92.3, 150); $|V_{c1}|$=176.1, at 61.5°; $V_{c2}$= (138.5, −75); $|V_{c2}|$=157.5, at −31.6°;
Magenta screen: $V_{m1}$=(138.5, 75); $|V_{m1}|$=157.5, at 31.6°; $V_{m2}$=(92.3, |150); $|V_{m2}|$=176.1, at −61.5°;
Black screen: $V_{k1}$=(0, 150); $|V_{k1}|$=150.0, at 0°; $V_{k2}$=(184.6, 0); $|V_{k2}|$=184.6, at 90°;
Yellow screen: $V_{y1}$=(92.3, 150); $|V_{y1}|$=176.1, at 61.5°; $V_{y2}$= (92.3, −150); $|V_{y2}|$=176.1, at −61.5°.

It is also interesting to note that such hexagon rosette patterns can be only realized by using non-orthogonal or parallelogram clustered-dot screens. The combination of the moiré-free condition and the hexagon-tiling condition requires four vector equations. Three square-shape halftone screens only provide three independent frequency vectors, therefore, no solution can be found for hexagonal rosettes. Even if rectangular cells are used, there is no rational solution for digital halftoning. On the other hand, three non-orthogonal parallelogram screens provide up to six independent frequency vectors, which are more than enough to get practical solutions for hexagon rosettes.

Another consideration is the relative shift, or phase positioning of the screens. The examples shown here align "holes" or white regions in a given halftone to white regions in the other separations. This alignment is known as "hole-centered" rosette. Note that other superimpositions could be aligned for different design goals. It is a well-known practice understood by those skilled in the halftone screen design arts to align multiple halftone screens for either dot-centered rosettes, hole-centered rosettes, or some structure that is a hybrid of those rosettes.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An image forming method for digitally reproducing a moiré-free color halftone image using a halftone screen set consisting of a halftone screen for each color, the method comprising:

using a color halftoning screening apparatus to perform:

defining a first color halftone screen having a first fundamental frequency vector $V_{c1}$ and second fundamental frequency vector $V_{c2}$;

defining a second color halftone screen having a first fundamental frequency vector $V_{m1}$ and second fundamental frequency vector $V_{m2}$;

defining a third color halftone screen having a first fundamental frequency vector $V_{y1}$ and second fundamental frequency vector $V_{y2}$; and, selecting the values of the fundamental frequency vectors $V_{c1}$, $V_{c2}$, $V_{m1}$, and $V_{m2}$ such that the combinations satisfy the following:

$$V_{c1} - V_{m1} = -\tfrac{1}{2} V_{m2},$$

$$V_{m2} - V_{c2} = -\tfrac{1}{2} V_{c1}, \text{ and}$$

$V_{y1}$ equals one of $V_{c1}$, $V_{c2}$, $V_{m1}$, and $V_{m2}$; and using said halftone screens, as further specified by said selected values of said fundamental frequency vectors, in an image forming apparatus for digital reproduction of a moiré-free color halftone image.

2. The method of claim 1 further comprising:

defining a fourth color halftone screen having a first fundamental frequency vector $V_{k1}$, and second fundamental frequency vector $V_{k2}$;

selecting the values of the fundamental frequency vectors $V_{k1}$ and $V_{k2}$ such that combinations satisfy the following:

$$V_{k2} - V_{c2} = \tfrac{1}{2} V_{c1},$$

$$V_{c1} - V_{k1} = \tfrac{1}{2} V_{k2}; \text{ and}$$

defining the fundamental frequency vector $V_{y2}$ to equal one of $V_{c1}$, $V_{c2}$, $V_{m1}$, $V_{m2}$, $V_{k1}$, and $V_{k2}$ and not equal to $\pm V_{y1}$.

3. The method of claim 2 further comprising:
selecting the values of the fundamental frequency vectors such that combinations further satisfy at least one of the following:

$V_{c1} - V_{m1} + V_{k2} = 0$, and $V_{c2} - V_{m2} - V_{k1} = 0$.

4. The method of claim 2 wherein the defined fourth color halftone screen having a first fundamental frequency vector $V_{k1}$ and second fundamental frequency vector $V_{k2}$, comprises the color black.

5. The method of claim 2 wherein a resultant halftone screen set output comprises hexagon rosettes of identical shape and are two-dimensionally periodic.

6. The method of claim 1 further comprising:
selecting the values of the fundamental frequency vectors such that combinations further satisfy at least one of the following:

$V_{c1} - V_{m1} + V_{k2} = 0$, and $V_{c2} - V_{m2} - V_{k1} = 0$.

7. The method of claim 1 wherein the defined first color halftone screen having a first fundamental frequency vector $V_{c1}$ and second fundamental frequency vector $V_{c2}$, comprises the color cyan.

8. The method of claim 1 wherein the defined second color halftone screen having a first fundamental frequency vector $V_{m1}$ and second fundamental frequency vector $V_{m2}$, comprises the color magenta.

9. The method of claim 1 wherein the defined third color halftone screen having a first fundamental frequency vector $V_{y1}$ and second fundamental frequency vector $V_{y2}$, comprises the color yellow.

10. A method for generating a plurality of non-orthogonal halftone screen outputs for moiré free color halftoning, the method comprising:
defining, using a color halftoning screening apparatus, a first and a second color halftone screen fundamental frequency vector for each of three halftone screens such that the halftone screen set output forms uniform hexagonal rosettes; and,
defining, using a color halftoning screening apparatus, a fourth color halftone screen where a first fundamental vector of the fourth screen shares a fundamental frequency vector with one of said three halftone screens and a second fundamental frequency vector of the fourth screen shares a fundamental frequency vector with a different one of said three color halftone screens.

11. The method of claim 10, wherein the fourth color halftone screen is used to form a yellow halftone image separation.

12. The method of claim 10, wherein said three color halftone screens are used to form cyan, magenta, and black halftone image separations.

13. A color halftoning screening apparatus for reproducing a moiré-free color halftone image using a halftone screen set consisting of a halftone screen for each color, the apparatus comprising:
a first color halftone screen having a first fundamental frequency vector $V_{c1}$ and second fundamental frequency vector $V_{c2}$;
a second color halftone screen having a first fundamental frequency vector $V_{m1}$ and second fundamental frequency vector $V_{m2}$ wherein combinations of the fundamental frequency vectors $V_{c1}$, $V_{c2}$, $V_{m1}$, and $V_{m2}$ satisfy the following:

$V_{c1} - V_{m1} = -\frac{1}{2} V_{m2}$, $V_{m2} - V_{c2} = -\frac{1}{2} V_{c1}$, and a third color halftone screen having a first fundamental frequency vector $V_{y1}$ and second fundamental frequency vector $V_{y2}$, where $V_{y1}$ equals one of $V_{c1}$, $V_{c2}$, $V_{m1}$, and $V_{m2}$.

14. The apparatus of claim 13 further comprising:
a fourth color halftone screen having a first fundamental frequency vector $V_{k1}$ and second fundamental frequency vector $V_{k2}$, wherein the values of the fundamental frequency vectors $V_{k1}$ and $V_{k2}$ satisfy the following:

$V_{k2} - V_{c2} = \frac{1}{2} V_{c1}$, $V_{c1} - V_{k1} = \frac{1}{2} V_{k2}$; and the fundamental frequency vector $V_{y2}$ is equal one of $V_{c1}$, $V_{c2}$, $V_{m1}$, $V_{m2}$, $V_{k1}$, and $V_{k2}$, and not equal to $\pm V_{y1}$.

15. The apparatus of claim 14 where the defined first color halftone screen having a first fundamental frequency vector $V_{c1}$ and second fundamental frequency vector $V_{c2}$, comprises the color cyan.

16. The apparatus of claim 14 wherein the defined second color halftone screen having a first fundamental frequency vector $V_{m1}$ and second fundamental frequency vector $V_{m2}$, comprises the color magenta.

17. The apparatus of claim 14 where the defined third color halftone screen having a first fundamental frequency vector $V_{y1}$ and second fundamental frequency vector $V_{y2}$, comprises the color yellow.

18. The apparatus of claim 14 where the defined fourth color halftone screen having a first fundamental frequency vector $V_{k1}$ and second fundamental frequency vector $V_{k2}$, comprises the color black.

19. The apparatus of claim 14 where a resultant halftone screen set output comprises hexagon rosettes of identical shape and are two-dimensionally periodic.

* * * * *